April 21, 1931.   F. STEIGENBERGER   1,802,224
COUPLING FOR CHAINS AND THE LIKE
Filed Oct. 24, 1929    4 Sheets-Sheet 1

Inventor:
Friedrich Steigenberger.
Attorney:

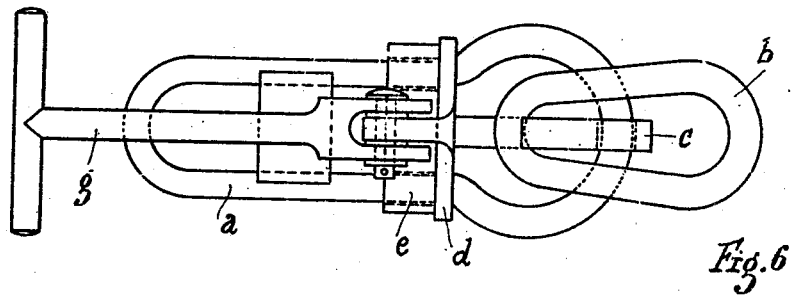
Fig.6
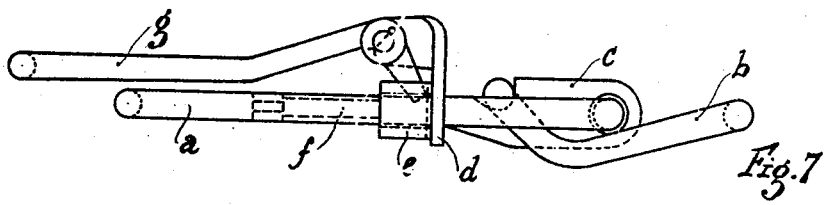
Fig.7
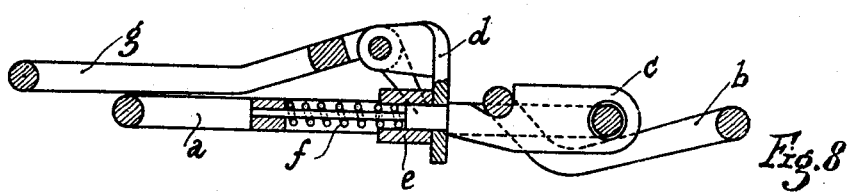
Fig.8
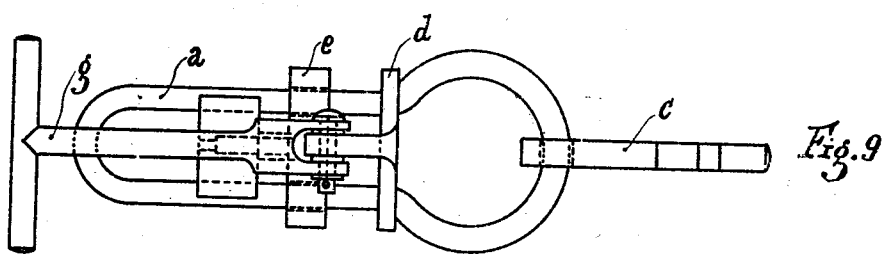
Fig.9
Fig.10
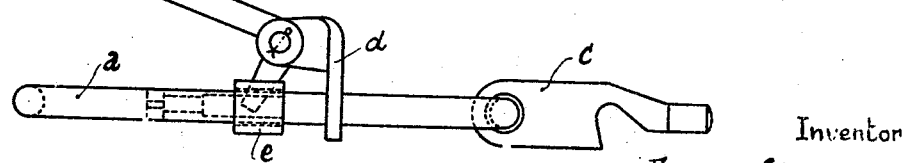
Inventor
Friedrich Steigenberger
Attorney

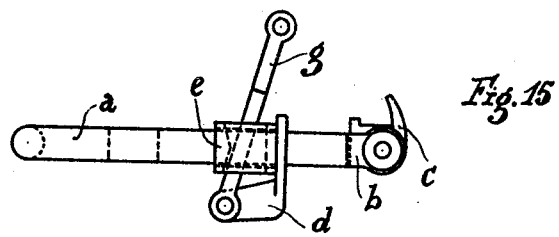
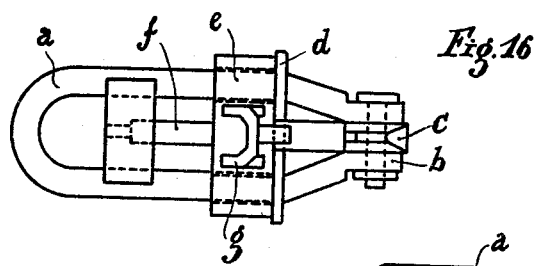
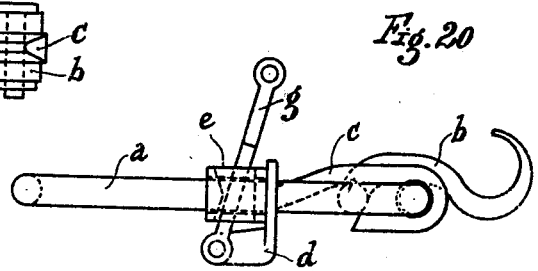
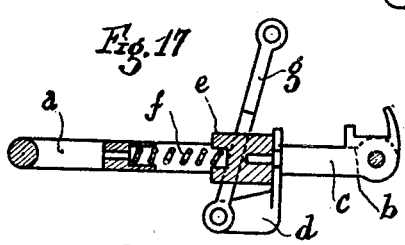
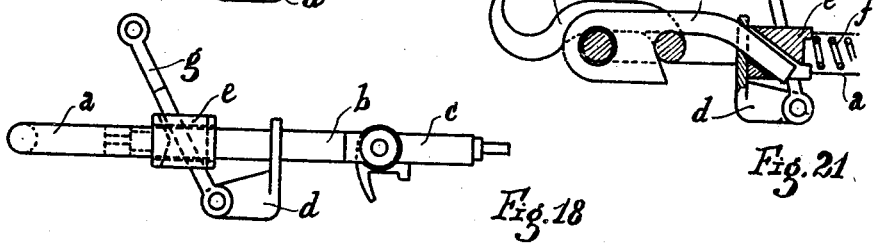
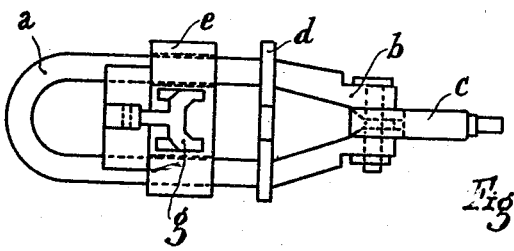

Patented Apr. 21, 1931

1,802,224

UNITED STATES PATENT OFFICE

FRIEDRICH STEIGENBERGER, OF ULM-ON-THE-DONAU, GERMANY

COUPLING FOR CHAINS AND THE LIKE

Application filed October 24, 1929, Serial No. 402,185, and in Germany May 27, 1929.

Heretofore traction devices such as chains, ropes, cables and the like used in agriculture and navigation have been provided with couplings which have been found very unreliable and insufficient in practice and frequently were the cause of great accidents and damages; for instance in cases of fire or inundation the cattle in the stable could not be rapidly released or not at all and therefore perished, or life-boats or towboats could not be detached rapidly enough from the connections or steamship and sank with the latter together with the passengers and goods.

My present invention has for its object to provide an improved coupling adapted to be rapidly unlocked for chains, ropes, cables and the like used in agriculture for attaching cattle and rapidly detaching same in cases of danger and in navigation as boat or ship lashings, for suspending and quickly detaching life-boats from ships as well as detaching tow-boats from steam-ships and wharves, such devices being also adapted to be used in conveying devices on board, or for coupling trucks and the like and as a practical substitute for shackles and swivels in yachts and sailers.

I have illustrated my improved coupling by way of example for various practical purposes in the accompanying drawings in which:

Fig. 6–10 are corresponding views of a coupling provided with an operating lever for heavy traction devices, for heavy loads in navigation.

Fig. 15 is a side elevation of a coupling in its locked position, provided with an operating lever serving to connect the sliphook of tow-boats or ships, trucks and other transporting devices.

Fig. 16 is a plan view of same.

Fig. 17 is a sectional side elevation of the same coupling in its unlocked position.

Fig. 18 is a side elevation of same.

Fig. 19 is a plan view thereof.

Fig. 20 shows another embodiment of the pivoted lever serving to receive the traction device;

Fig. 21 is a sectional side elevation showing one application of said lever in its locked position.

Figure 1:
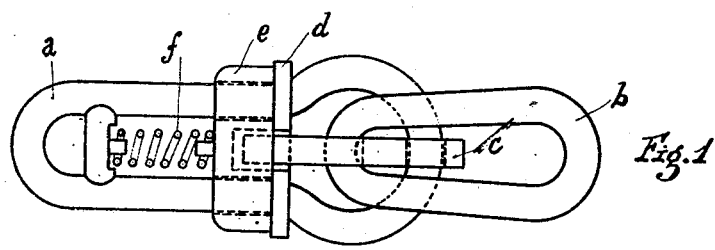
Fig. 1 is a plan view of a locked coupling such as may be used in light traction devices in agriculture and in heavier devices in navigation.
Figure 2:
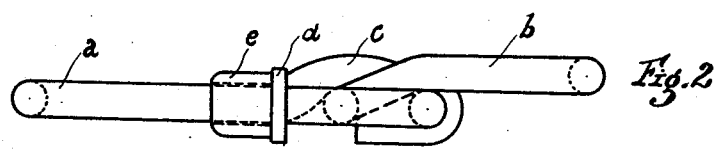
Fig. 2 is a side elevation of same.
Figure 3:
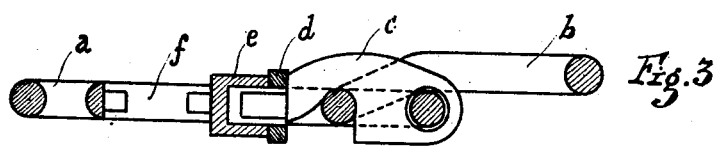
Fig. 3 is a sectional side elevation.
Figure 4:
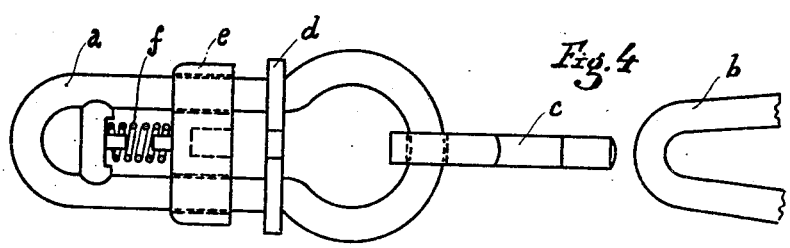
Fig. 4 is a plan view of the coupling in unlocked position.
Figure 5:
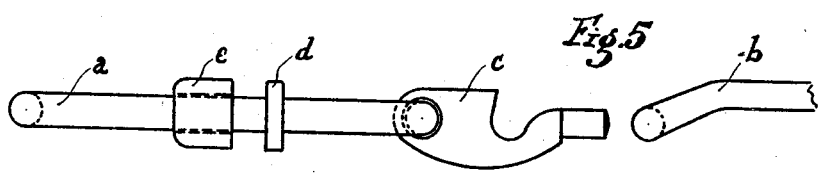
Fig. 5 is a side elevation of same.

Referring now to Figs. 1 to 5, $a$ is the main member of the coupling intended to be connected to one part of a traction or hauling device; $b$ is the connecting member firmly connected to the other part of the traction device and prevented from being rotated by its particular curvature, said connecting member being adapted to be unlocked; $c$ is a pivoted lever easily rotatable around the main member $a$ and provided with a notch for the reception of the connecting member $b$; said lever $c$ has a pin shaped free end, engaging an aperture in the sliding-bolt $e$ if the coupling is firmly connected and it is formed in the shape of a central tongue of a buckle for the main member $a$ and turnable around one yoke portion thereof. The lever $c$ is adapted to be locked in position by means of a sliding bolt $e$ guided on both longitudinal sides of the main member $a$ and limited by a lug $d$.

$f$ is a spring attached to a cross-bar of the main member $a$ and adapted to be housed partly or completely in said cross-bar; said spring $f$ serves to secure the coupling in its locked position and it may be completely uncovered or protected by a sleeve or mounted within the sliding bolt $e$, the cross-bar on the main member $a$ serving as a bearing member for said spring.

In this embodiment the coupling may be unlocked by a pressure of the fingers on the sliding bolt $e$.

In the embodiment shown in Figs. 6 to 10 the coupling will not be unlocked directly by a pressure of the fingers on the sliding bolt e, but through the agency of an operating lever g. Said operating lever g is pivoted on the main member a, in such a way that upon turning the same upwardly the lever c engaging the sliding bolt e will cause the latter to slide whereby the coupling will be unlocked.

Figure 11:
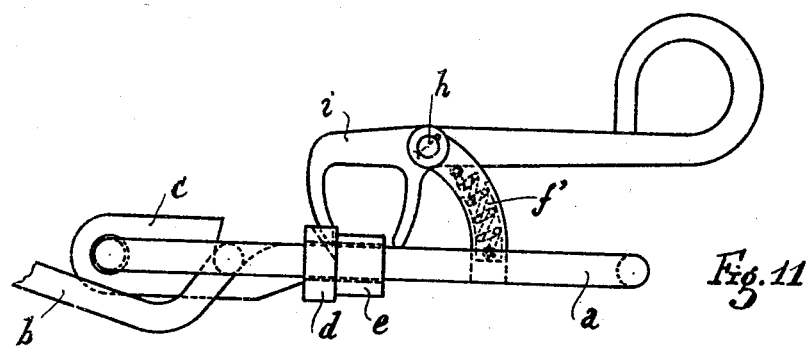
Fig. 11 is a side elevation of another coupling in locked position.
Figure 12:
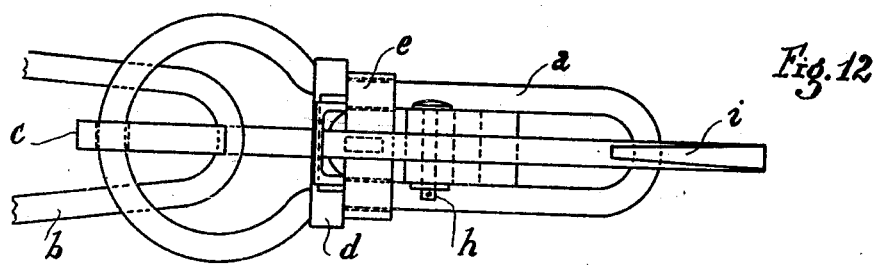
Fig. 12 is a plan view of same.
Figure 13:
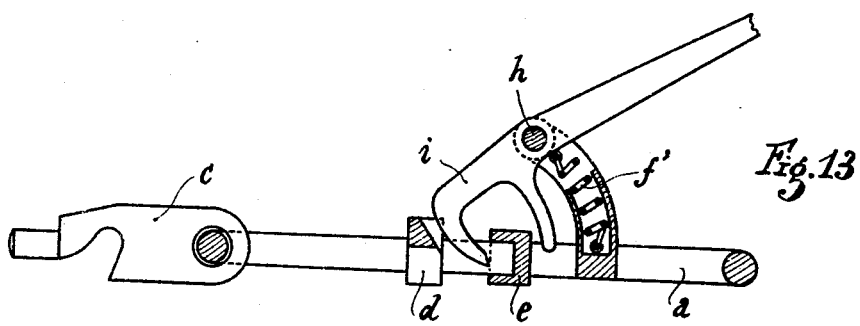
Fig. 13 is a side elevation of the same coupling in unlocked position.
Figure 14:
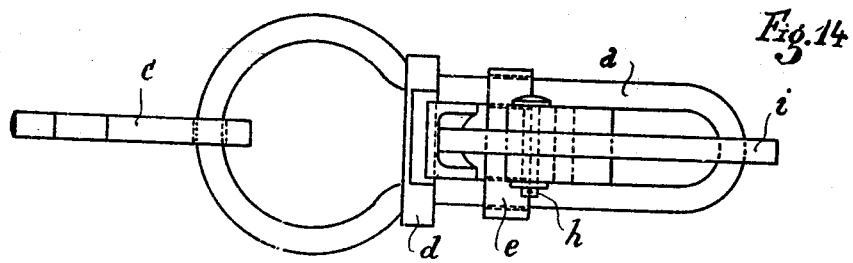
Fig. 14 is a plan view of same.

The coupling shown in Figs. 11 to 14 also comprises the members a, b, c, d, e already described. h is an arm mounted on the main member a and having a pivotal pin, on which an operating lever i is rotatably mounted, said lever i having two extensions engaging both ends of the sliding bolt e. f is a spring serving to move the operating lever i backwardly upon its release. In this embodiment the coupling will be actuated by the depression of the operating lever i and said coupling has the advantage that upon the release by the sliding bolt e the pivoted lever c will be depressed by the nose of the lever i.

In Figures 15 to 21 the main member a is provided with a fork-shaped operating lever g. The pivoted lever c has a hook-shaped nose for the reception of the traction device of the vehicle and it is rotatably secured in a bolt and firmly connected to the main member a, so as to remain suspended from the main member a upon the unlocking of the coupling, said lever c being turned downwardly (rearwardly) upon the unlocking, whereby the traction device will slide over the nose thereof to be detached. It will be seen that said lever c will be a substitute for the connecting member of the other embodiment.

In this embodiment the coupling will not be unlocked by hand on the sliding bolt e, but through the agency of the operating lever g, and said coupling is particularly applicable as ship-hook coupling for towships. To this end said lever g will be actuated directly or by means of a cable from the steering place or any other suitable place.

The pivoted lever c as shown in Figs. 20 and 21 serves also to receive the traction device, but not like in Figs. 15 to 19 as a substitute for the connecting member b and it is not firmly connected to the main member a but shaped like the connecting member b shown in Figs. 1 to 14.

This kind of coupling is particularly applicable for coupling trucks or the like and may also be operated either directly or from any desired side in order to avoid the risk of injury when creeping between the trucks; to this end the operating cables may be guided on rollers on both sides of the vehicles, or levers or suitable noses may be applied to the operating levers g or the pivotal pins thereof.

Fig. 21 shows a sectional side elevation of the coupling in locked position, the free end of the pivoted lever c being curved according to the radius of the swinging arc of said lever and the aperture in the sliding bolt e being formed obliquely according to said curved end.

In order to lock the coupling according to any embodiment described, the pivoted lever c will be turned forwardly, the connecting member b will be placed into the nose of said lever c, the sliding bolt e will be moved backwardly until the pin on the lever c will engage said sliding bolt.

The main features and advantages of my invention are as follows:

(I) The possibility of immediately unlocking the coupling in cases of danger.

The sliding bolt c is protected against traction and pressure by the lug d, therefore said bolt will not be submitted to any strain, strain being produced on the frame of the main member a only, the connecting member b being engaged in the pivoted lever c in such a way that in the locking position of the sliding bolt e the horizontal traction and pressure will be compensated and rendered insufficient, producing no strain on the spring f connected to the sliding bolt e. Therefore the greatest possible tension produced on the chain, rope, cable or the like has no interfering action on said sliding bolt; the greater said tension, that is the stronger the animal pulls on its attaching chain or the stronger the cables of life-boats on steam-ships or the like are tensioned, the easier the coupling may be unlocked by the operator, particularly because horizontal traction and pressure will even act a little rearwardly, whereby the unlocking of the coupling will be favoured. In agricultural plants such unlocking will always be effected in cases of great danger by a slight pressure of the fingers on the sliding-bolt c, and in navigation or on trucks by a pull on the operating lever, whereupon the pivoted lever c will be automatically released by the traction of the chain, rope or cable produced by the attached animal or natural forces in stormy weather or the like, because the portion of the pivoted lever c loosely engaging the sliding bolt e will never be in a wedged position. The unlocking of the coupling will not be interfered with after the pivoted lever c or the main member a has become thinner by wear and come into deeper engagement with the sliding bolt.

(II) Protection against accidental self-uncoupling.

Heretofore all attempts to make a coupling of this type were not practical because accidental self-uncoupling was possible by outer influences (pressure, traction, shocks, friction, wedging, engaging nails and the like provoked by multiple movements of the animal, or in navigation by the stormy weather on chains, ropes, cables, life-boats and tow-ships).

In this respect the objects of my invention are:

(1) To provide the particular lug $d$ forming a protecting ring firmly surrounding the main member $a$ and extending over the sliding-bolt $e$ to limit the sliding movement thereof.

(2) To provide the particular pivoted lever $c$, the back part of which is applied against the sliding bolt $e$ and fills out the short remaining portion of the lug-ring $d$; said back part of lever $c$ being in the same plane as the ring $d$ and sliding bolt $e$ so that any otherwise hindering device may smoothly slide over said back part without interference and cannot be grasped at the place where the pin on the pivoted lever $c$ engages the hole in the sliding bolt $e$.

(3) To provide the particular connecting member $b$, located in the centre of the main member $a$, whereby the sliding bolt $e$ will not be submitted to any strain upon the production of traction or pressure, at the same time avoiding any engaging point on said sliding-bolt. Therefore the latter can in no case be influenced by outer forces and devices and engaged and unlocked accidentally.

(III) Possibility of interchanging the spring $f$.

The spring $f$ may be completely removed in couplings where it is not protected or simply inserted into a sleeve.

Having now fully described my said invention, what I claim and desire to secure by Letters Patent, is:

1. In a coupling for chains, ropes, cables and the like, the combination of a frame shaped main member, a suitably curved lever pivoted at one end of said main member, and intended to be engaged by the connecting member at the end of the chain or the like, a lug substantially midway of the frame of said main member, an aperture in said lug for the reception of the free end of said pivoted lever, a locking bolt slidably arranged on the main member on the portion thereof opposite the end supporting the pivoted lever, and a suitable spring urging said locking bolt against said lug to retain the pivoted lever in its operative position, substantially as set forth.

2. In a coupling for chains, ropes, cables and the like, the combination of a frame shaped main member, a suitably curved lever pivoted at one end of said main member, and intended to be engaged by the connecting member at the end of the chain or the like, a lug substantially midway of the frame of said main member, an aperture in said lug for the reception of the free end of said pivoted lever, a locking bolt slidably arranged on the main member on the portion thereof opposite the end supporting the pivoted lever, and a suitable spring urging said locking bolt against said lug to retain the pivoted lever in its operative position, a suitable bracket formed on the upper part of the lug, a pivoted pin in said bracket, a bell crank lever pivoted on said pivotal pin and engaging the locking bolt, substantially as and for the purpose set forth.

3. In a coupling for chains, ropes, cables and the like, the combination of a frame shaped main member, a suitably curved lever pivoted on one end of said main member and shaped to receive and retain the end of the chain or the like, a lug substantially midway of the frame of the main member, an aperture in said lug for the reception of the free end of said pivoted lever, a locking bolt slidably arranged on said main member on the portion thereof opposite the end supporting the pivoted lever, a suitable hollow bracket on said portion of the main member, a lever pivoted on the upper end of said bracket, depending extensions on said lever adapted to engage said locking bolt, and a suitable spring in said hollow bracket urging said lever in the direction corresponding to the locking position of said locking bolt, substantially as set forth.

4. In a coupling for chains, ropes, cables and the like, the combination of a frame-shaped main member, a suitably curved lever pivoted on one end of said main member and shaped to receive and retain the end of the chain or the like, a lug arranged on said main member, an aperture in said lug for the reception of the free end of said pivoted lever, a locking bolt slidably arranged on the main member and adapted to engage the free end of said pivoted lever, a spring urging said locking bolt against said lug, a depending bracket on the lug, a lever pivoted on said bracket, and a suitable connection between said lever and locking bolt, substantially as and for the purpose set forth.

FRIEDRICH STEIGENBERGER.